(12) United States Patent
Sundman et al.

(10) Patent No.: US 10,440,748 B2
(45) Date of Patent: Oct. 8, 2019

(54) FIRST COMMUNICATIONS DEVICE AND METHODS THEREIN FOR TRANSMITTING DATA TO A SECOND COMMUNICATIONS DEVICE

(71) Applicant: Telefonaktiebolaget LM Ericsson (publ), Stockholm (SE)

(72) Inventors: Dennis Sundman, Solna (SE); Miguel Lopez, Solna (SE); Thomas Nilsson, Malmö (SE); Nafiseh Shariati, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 629 days.

(21) Appl. No.: 15/108,362

(22) PCT Filed: Apr. 28, 2016

(86) PCT No.: PCT/SE2016/050375
§ 371 (c)(1),
(2) Date: Jun. 27, 2016

(87) PCT Pub. No.: WO2017/188870
PCT Pub. Date: Nov. 2, 2017

(65) Prior Publication Data
US 2018/0103491 A1    Apr. 12, 2018

(51) Int. Cl.
*H04W 72/08*    (2009.01)
*H04W 74/08*    (2009.01)
*H04W 52/02*    (2009.01)

(52) U.S. Cl.
CPC ... *H04W 74/0816* (2013.01); *H04W 52/0238* (2013.01)

(58) Field of Classification Search
CPC .............................. H04W 74/02; H04W 74/08
See application file for complete search history.

(56) References Cited

U.S. PATENT DOCUMENTS

| 5,148,148 A | 9/1992 | Shima et al. |
| 2007/0019592 A1* | 1/2007 | Otsuki ............. H04W 74/0816 370/338 |

(Continued)

FOREIGN PATENT DOCUMENTS

EP    2717644 A1    4/2014

OTHER PUBLICATIONS

IEEE, "Part 11: Wireless LAN Medium Access Control (MAC) and Physical Layer (PHY) Specifications", IEEE Standard for Information technology—Telecommunications and information exchange between systems Local and metropolitan area networks—Specific requirements IEEE Std 802.11 2012 (Revision of IEEE Std 802.11-2007), Mar. 29, 2012, 1-2793.

(Continued)

*Primary Examiner* — Sulaiman Nooristany
(74) *Attorney, Agent, or Firm* — Murphy, Bilak & Homiller, PLLC

(57) ABSTRACT

A first communications device 102 and a method therein for transmitting data to a second communications device 104 on a sub-channel. The first device performs carrier sensing on a first sub-channel assigned an unknown occupancy state. When the first sub-channel is determined as being vacant, the first device transmits, to the second device, the data on the first sub-channel. When the first sub-channel is determined as being occupied, the first device assigns the first sub-channel an occupied state, starts a first time period associated with the first sub-channel, and performs carrier sensing on a second sub-channel assigned with the unknown occupancy state. When the second sub-channel is determined as being vacant, the first device transmits, to the second device, the data on the second sub-channel. In absence of the second sub-channel assigned an unknown (Continued)

occupancy state, the first device enters an inactive mode until the first time period has expired.

14 Claims, 5 Drawing Sheets

(56) References Cited

U.S. PATENT DOCUMENTS

2008/0084835 A1    4/2008    Goel et al.
2016/0081098 A1*  3/2016    Wu .................. H04W 74/0808
                                                                                               370/329
2017/0265082 A1*  9/2017    Jiang .................... H04W 16/14

OTHER PUBLICATIONS

Perahia, Eldad et al., "Next Generation Wireless LANs Throughput, Robustness, and Reliability in 802.11n", Cambridge University Press 2008 www.cambridge.org/9780521885843, 2008, 1-416.

Rom, Raphael et al., "Multiple Access Protocols: Performance and analysis", Springer-Verlag New York, NY, 1990, 1-177.

Unknown, Author, "Linux Wireless", https://wireless.wiki.kernel.org/en/developers/documentation/mac80211/ratecontrol/minstr.el.txt, Jan. 12, 2016, 1-6.

Xu, Jia et al., "Single-radio multi-subchannel random access for OFDMA wireless networks", Electronics Letters vol. 49 No. 24, Nov. 21, 2013, 1574-1576.

* cited by examiner

FIRST COMMUNICATIONS DEVICE AND METHODS THEREIN FOR TRANSMITTING DATA TO A SECOND COMMUNICATIONS DEVICE

TECHNICAL FIELD

Embodiments herein relate generally to a first communications device, and to a method therein. In particular, embodiments relate to transmitting data to a second communications device on a sub-channel of a total bandwidth of a communications network.

BACKGROUND

Communication devices such as terminals are also known as e.g. User Equipments (UEs), mobile terminals, stations (STAs), wireless devices, wireless terminals and/or mobile stations. Terminals are enabled to communicate wirelessly in a wireless communications network, such as a Wireless Local Area Network (WLAN), or a cellular communications network sometimes also referred to as a cellular radio system or cellular networks. The communication may be performed e.g. between two terminals, between a terminal and a regular telephone and/or between a terminal and a server via an access network and possibly one or more core networks, comprised within the wireless communications network.

The above communications devices may further be referred to as mobile telephones, cellular telephones, laptops, or tablets with wireless capability, just to mention some further examples. The communications devices in the present context may be, for example, portable, pocket-storable, hand-held, computer-comprised, or vehicle-mounted mobile devices, enabled to communicate voice and/or data, via the access network, such as a Radio Access Network (RAN), with another entity, such as another communications device or a server.

The communications network covers a geographical area which is divided into geographical subareas, such as coverage areas, cells or clusters. In a cellular communications network each cell area is served by an access node such as a base station, e.g. a Radio Base Station (RBS), which sometimes may be referred to as e.g. "eNB", "eNodeB", "NodeB", "B node", or Base Transceiver Station (BTS), depending on the technology and terminology used. The base stations may be of different classes such as e.g. macro eNodeB, home eNodeB, micro eNode B or pico base station, based on transmission power, functional capabilities and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the wireless devices within range of the base stations. In the context of this disclosure, the expression Downlink (DL) is used for the transmission path from the base station to the wireless device. The expression Uplink (UL) is used for the transmission path in the opposite direction i.e. from the wireless device to the base station.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

Institute of Electrical and Electronics Engineers (IEEE) 802.11 (IEEE Computer Society, "IEEE Std 802.11™-2012, Part 11: Wireless LAN Medium Access Control (MAC) and Physical Layer (PHY) Specifications", ISBN: 978-0-7381-7245-3 STDPD97218) is a set of Media Access Control (MAC) and PHYsical layer (PHY) specifications for implementing Wireless Local Area Network (WLAN) computer communication in the 2.4, 3.6, 5, and 60 GHz frequency bands. They are created and maintained by the IEEE Local Area Network (LAN)/Metropolitan Area Network (MAN) Standards Committee (IEEE 802). The base version of the standard was released in 1997, and has had subsequent amendments. The standard and amendments thereof provide a local area wireless computer networking technology that allows electronic devices to connect to a network. A WLAN is sometimes referred to as a WiFi network.

In a WiFi network, communications devices, sometimes referred to as stations (STAB), are associated to one or more Access Points (APs) in order to communicate with each other and to the Internet. Several communications devices may be within direct reach of each other, and since they share the same communication medium, i.e. the WiFi network, mechanisms to avoid collisions exist.

In for example the WiFi network in accordance with the IEEE 802.11 standard, a carrier sensing mechanism using 1-persistent slotted Carrier Sense Multiple Access (CSMA) with random back off time and with Collision Avoidance (CA) is used. Such mechanism is in this disclosure shortly referred to as a CSMA/CA and it will be described briefly below. For further details on 1-persistent slotted CSMA, reference is made to Multiple Access Protocols, Raphael Rom and Moshe Sidi (Raphael Rom and Moshe Sidi, Multiple Access Protocols: performance and analysis, New York, N.Y.: Springer-Verlag N.Y., Inc, 1990, ISBN:0-387-97253-6), and for further details on random backoff and CA reference is made to pages 221 and 230 in Next Generation Wireless LANs, Eldad Perahia and Robert Stacey (Eldad Perahia and Robert Stacey, Next Generation Wireless LANs, University Printing House, Cambridge University Press, ISBN: 978-1107016767).

The expression 1-persistent CSMA means that a communications device that finds a communications channel busy will attempt to access the channel as soon as it becomes available. That the sensing is slotted means that time, e.g. a period of time, is divided into time-slots of a specific size. The use of random back off means that instead of accessing the channel immediately when it becomes available, the communications device has to monitor the channel being idle for a back off integer number of time-slots, chosen randomly between 0 and a Contention Window (CW) value, wherein the CW value is a positive integer.

The CA infers two things. Firstly, prior to any transmission, the channel has to be sensed as idle for at least one time-slot, and secondly, when an ACK is not received, i.e., communication is failed, the communications device has to select a new random back off before attempting to sense and transmit again. In practice, there is also a Distributed Inter-Frame Space (DIFS), e.g. a distributed coordination function interframe space time, on top of the random back off. In modern WiFi technologies there are two types of mechanisms used simultaneously for the actual carrier sensing: physical carrier sensing and virtual carrier sensing.

In physical carrier sensing, the received energy measured in the analog front-end of the antenna may be determined. If the received energy is above a certain threshold value, the channel is regarded as occupied. Traditionally, when a communications device, e.g. a STA, detects the channel to be busy by physical carrier sensing, it continues to monitor the channel until it becomes available. This is referred to as 1-persistent carrier sensing.

Another variant of physical carrier sensing is preamble detection in which a receiver, e.g. a first communications device, actively tries to detect and decode a PHY layer preamble of a transmitter, e.g. a second communications device. Typically, the transmitter is of the same technology as the receiver. If a preamble is detected and decoded, information of the expected duration of the full communication exchange is available in the duration field of the header. IN IEEE 802.11ah, this is referred to as Response Indication Deferral (RID). For further details on physical carrier sensing, reference is made to page 228 of Next Generation Wireless LANs, Eldad Perahia and Robert Stacey (Eldad Perahia and Robert Stacey, Next Generation Wireless LANs, University Printing House, Cambridge University Press, ISBN: 978-1107016767).

Virtual carrier sensing utilizes channel reservation information carried in the MAC headers announcing imminent use of the communications medium, e.g. the WiFi network. In WiFi, the virtual carrier sensing mechanism is referred to as Network Allocation Vector (NAV), and the time extracted from the header may be referred to as the NAV time. It should be noted that the virtual carrier sensing is similar to the version of physical layer sensing wherein the preamble is decoded, but in virtual carrier sensing, higher layers than just the PHY layer has to be involved. And more importantly, in virtual carriers sensing, the whole packet needs to be decoded in order to recover the MAC header.

In wireless communications, it may be of interest to maximize the utilization of available bandwidth. For example, choosing the appropriate Modulation and Coding Scheme (MCS) optimizes the throughput. Having a robust MCS, e.g. a low communication rate, leads to high reliability, but requires more time for the communication, while a too weak MCS, e.g. a high communication rate, reduces the reliability, but enables communication in shorter time. The task of choosing the right MCS is conventionally done by an algorithm called the Minstrel algorithm. In short, the task of the Minstrel algorithm is to choose the resource, in this case the MCS, that provides the best throughput. For more details regarding the Minstrel algorithm, see https://wireless.wiki.kernel.org/en/developers/documentation/mac80211/ratecontrol/minstr el.

Long Range Low Power (LRLP) is a new topic interest group within the IEEE 802.11 working group. The intention with LRLP is to provide increased communication range as compared the communication range provided by the IEEE 802.11 ax, and to enable the use of low power communications devices running on battery. One key feature to enable the increased communication range is a narrow frequency band. Currently, the proposal is to split the total bandwidth used by the IEEE 802.11ax into a number of sub-channels, wherein each sub-channel may be used as a full channel for a narrow band LRLP communications device. Thus, the LRLP communications devices may interact on the same band as the legacy IEEE 802.11 communications devices. The bandwidth of LRLP communications devices and total number of sub-channels have not yet been agreed upon in the IEEE 802.11 standardization, but preliminary discussions suggest that there may be from 4 to 9 sub-channels per 20 MHz. Thus, the sub-channel bandwidth may be around 2 MHz to 5 MHz.

For LRLP communications devices, low power is a main focus. Sampling a large channel bandwidth requires power, and therefore, an LRLP communications device may not have the capability to sample the full bandwidth over which the IEEE 802.11ax WiFi is operating. Instead, the LRLP communications device may only be able to sample one sub-channel at a time. Currently, the LRLP idea to resolve this is to let the AP schedule the use of the channel for the LRLP communications devices. For example, the AP may transmit a legacy preamble, occupying the channel so that the legacy communications devices may back off for a certain period of time. After this is done, there may be several modes of LRLP operation. For example, one mode of LRLP operation may be a scheduled mode, wherein the AP schedules each LRLP communication device to a certain sub-channel and period of time in order to maximize some utilization criteria. Another example of a mode of LRLP operation is a non-scheduled mode, wherein the LRLP communications devices compete for the media under a predefined time.

One wide-spread technology using multiple non overlapping sub-bands is Bluetooth. However, Bluetooth does not perform any carrier sensing. Instead, it uses a Frequency Hopping Spread Spectrum (FHSS) technique, which switches among sub-channels and uses them immediately without any sensing. A collision on one sub-channel is resolved at higher layers, for example by retransmission. The switching among sub-channels follows a pseudorandom pattern known to both the transmitter and the receiver. If a certain sub-channel turns out to often be bad, it may be blacklisted by the transmitter. The blacklist needs to be known also to the receiver. When a sub-channel on the black list is selected, the transmitter refrains from using that sub-channel and instead moves on to the next good sub-channel.

In the document Single-radio multi-subchannel random access for OFDMA wireless networks, to Jia Xu, Pin Lv and Xudong Wang (Jia Xu, Pin Lv and Xudong Wang, "Single-radio multi-subchannel random access for OFDMA wireless networks, "Electronics Letters, 49(24) pp. 1574-1575, November 2013), CSMA over multiple sub-channels is considered. Further, full sampling over all sub-channels is available, and several sub-channels are used for data transmission.

Some drawbacks with the existing solutions for utilization of multiple sub-channels is that they are either scheduled as in 3GPP-like communication schemes; that they are blindly transmitting on sub-channels as in Bluetooth, or that they require the capability to monitor all the sub-channels simultaneously,

SUMMARY

An object of embodiments herein is to address at least some of the above-mentioned drawbacks among others and to improve the performance in a communications network.

According to one aspect of embodiments herein, the object is achieved by a method performed by a first communications device for transmitting data to a second communications device on a sub-channel of a total system bandwidth of a communications network. The total system bandwidth comprises two or more sub-channels.

The first communications device performs carrier sensing on a first sub-channel assigned an unknown occupancy state to determine whether the first sub-channel is vacant or occupied.

When the first sub-channel is determined as being vacant, the first communications device transmits, to the second communications device, the data on the first sub-channel.

When the first sub-channel is determined as being occupied, the first communications device assigns the first sub-channel an occupied state, starts a first time period associated with the first sub-channel, and performs carrier sensing on a second sub-channel assigned the unknown occupancy state to determine whether the second sub-channel is vacant or occupied.

When the second sub-channel is determined as being vacant, the first communications device transmits, to the second communications device, the data on the second sub-channel.

In the absence of the second sub-channel assigned an unknown occupancy state, the first communications device enters an inactive mode until the first time period has expired.

According to another aspect of embodiments herein, the object is achieved by a first communications device for transmitting data to a second communications device on a sub-channel of a total system bandwidth of a communications network. The total system bandwidth comprises two or more sub-channels.

The first communications device is configured to perform carrier sensing on a first sub-channel assigned an unknown occupancy state to determine whether the first sub-channel is vacant or occupied.

When the first sub-channel is determined as being vacant, the first communications device is configured to transmit, to the second communications device, the data on the first sub-channel.

When the first sub-channel is determined as being occupied, the first communications device is configured to assign the first sub-channel an occupied state, to start a first time period associated with the first sub-channel, and to perform carrier sensing on a second sub-channel assigned the unknown occupancy state to determine whether the second sub-channel is vacant or occupied.

When the second sub-channel is determined as being vacant, the first communications device is configured to transmit, to the second communications device, the data on the second sub-channel.

In the absence of the second sub-channel assigned an unknown occupancy state, the first communications device is configured to enter an inactive mode until the first time period has expired.

According to another aspect of embodiments herein, the object is achieved by a computer program, comprising instructions which, when executed on at least one processor, causes the at least one processor to carry out the method performed by the first communications device.

According to another aspect of embodiments herein, the object is achieved by a carrier comprising the computer program, wherein the carrier is one of an electronic signal, an optical signal, a radio signal or a computer readable storage medium.

Since the first communications device, when the first sub-channel is determined as being occupied, assigns the first sub-channel an occupied state, starts a first time period associated with the first sub-channel, and performs carrier sensing on a second sub-channel assigned the unknown occupancy state, since the first communications device, when the second sub-channel is determined as being vacant, transmits, to the second communications device, the data on the second sub-channel, and since the first communications device, in the absence of the second sub-channel assigned an unknown occupancy state, enters an inactive mode until the first time period has expired, the first communications device will be in an active mode only when searching for a sub-channel available for transmission and when transmitting data on the available sub-channel. If no sub-channel is available for transmission the first communications device will enter an inactive mode until its next try to find an available sub-channel. Thereby, the power consumption of the first communications device is reduced. This results in an improved performance in the communications network since the first communications device will be able to operate in the communications network for an extended period of time before it needs to be recharged or replaced.

An advantage with embodiments herein is that they provide for carrier sensing wherein in all available sub-channels may be exploited but without requiring that the communications device, e.g. the first communications device, is capable of simultaneously monitoring two or more sub-channels.

Another advantage with embodiments herein is that they enable the communications device, e.g. the first communications device, to be in an inactive mode as much as possible, whereby power, e.g. battery power, is conserve, while enabling the communications device to access the medium faster than in the current IEEE 802.11 standardized version of carrier sensing, e.g. the CSMA.

A further advantage with embodiments herein is that they provide a completely de-centralised method and do not require any coordination among the communications devices.

Yet another advantage with embodiments herein is that it allows for fair usage of the available radio resources,

BRIEF DESCRIPTION OF DRAWINGS

Examples of embodiments herein are described in more detail with reference to attached drawings in which.

DETAILED DESCRIPTION

Figure 1:
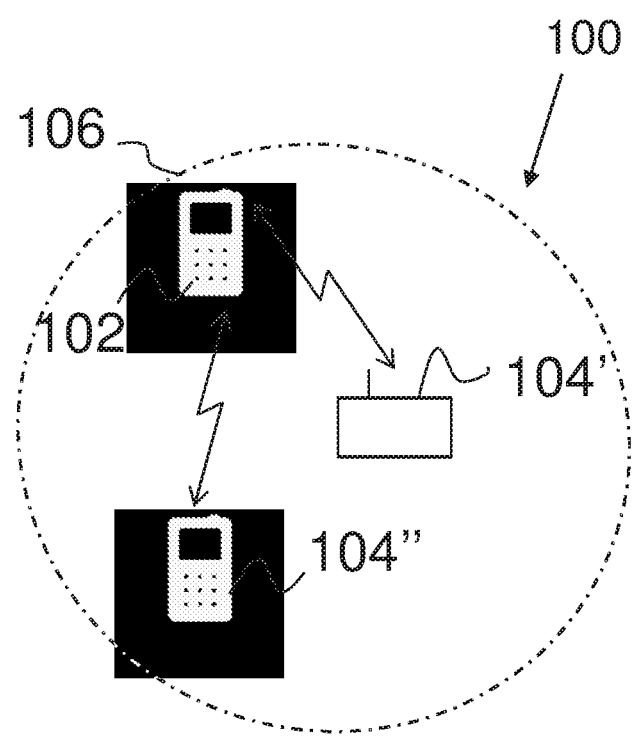
FIG. 1 schematically illustrates embodiments of a wireless communications network.

In order to facilitate understanding of embodiments herein, some problems with the state of the art communications networks will first be identified and discussed.

As mentioned above, some drawbacks with the existing solutions for utilization of multiple sub-channels in a communications network is that they are either scheduled as in the 3GPP-like communication schemes; that they are blindly transmitting on sub-channels as in the Bluetooth systems, or that they require the capability to monitor all the sub-channels simultaneously. In WiFi, it is not desirable to limit the solution to a scheduled approach since the communications devices, e.g. low power devices, operating in the WiFi may need to transmit at unpredictable points in time. Further, due to regulations, it is not possible to ignore carrier sensing as in the non-CSMA approach provided by the Bluetooth systems. Furthermore, ignoring the CSMA only makes sense when there are very many sub-channels, which may not be the case in communications networks for low power devices. Finally, since communications devices such as low power devices are targeted herein, sampling the full channel, comprising all sub-channels, is not desirable, as one important ingredient in decreasing the power consumption is to limit both reception and transmission to channels with narrow bandwidths.

A contention based access scheme specially tailored to low power devices which are unable to monitor the full system bandwidth is missing in the prior art. Such contention based access scheme is desirable in for example the IEEE 802.11 systems targeting Internet of Things (IoT) applications.

A problem addressed by embodiments herein is therefore how to provide an improved performance in a wireless communications system.

Therefore, as mentioned above, according to embodiments herein, a way of improving the performance in a wireless communications system is provided.

Note that although terminology from the WLAN technology is used in this disclosure to exemplify the embodiments herein, this should not be seen as limiting the scope of the embodiments herein to only the aforementioned system. Other wireless systems, such as for example Wideband Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

In this section, the embodiments herein will be illustrated in more detail by a number of exemplary embodiments. It should be noted that these embodiments are not mutually exclusive. Components from one embodiment may be assumed to be present in another embodiment and it will be obvious to a person skilled in the art how those components may be used in the other exemplary embodiments.

Further, in this disclosure it is assumed that the sub-channels are orthogonal in frequency. Thereby good performance for simultaneous transmission in the uplink from the communications device, e.g. from the LRLP communications devices and the IEEE 802.11ax communications devices, is ensured. As known to those skilled in the art, sub-channels orthogonal in frequency may be obtained by sufficient guard bands and/or sufficient synchronization in the communications network, and will therefore not be described in more detail herein.

FIG. 1 depicts an example of a communications network 100 in which embodiments herein may be implemented. The communications network 100 is a wireless communications network such as a Carrier Sense Multiple Access (CSMA) based communications network, or a communications network that deploy some kind of random backoff, e.g. some kind of Contention Window (CW), before allowing transmission when the communications network 100 has been found to be idle. However, the communications network 100 may be another type of communications network having CSMA or CSMA-like access employing schemes that are similar to random backoff schemes. Thus, it may be a WLAN, an LTE network, a Wideband Code Division Multiple Access (WCDMA) network, a Global System for Mobile Communications (GSM) network, any 3GPP cellular network, Worldwide Interoperability for Microwave Access (WiMAX) network, any other wireless network having CSMA or CSMA-like access employing some kind of random backoff, or a combination of one or more of the aforementioned communications networks.

A first communications device 102 operates in the communications network 100. Thus, the first communications device 102 is configured to operate in the communications network 100. Further, the first communications device 102 may be comprised in the communications network 100. The first communications device 102 may be an Internet of Thing (IoT) device, an LRLP device such as a sensor, or a user equipment.

A second communications device 104 operates in the communications network 100. Thus, the second communications device 104 is configured to operate in the communications network 100. The second communications device 104 may be comprised in the communications network 100.

The second communications device 104 may be an Access Point (AP) 104'. The AP 104' may be a wireless access node, such as a WLAN access node or a radio access node. The radio access node may be a radio base station, for example an eNB, i.e. an eNodeB, or a Home Node B, an Home eNode B or any other network node capable to serve and/or communicate with a communications device, such as the first communications device 102, in the communications network 100.

Alternatively, the second communications device 104 is not an AP but another device 104" such as an Internet of Thing (IoT) device, an LRLP device e.g. a sensor, or a user equipment.

In some of the embodiments described herein the non-limiting term user equipment (UE) is used and it refers to any type of device communicating with a network node in a wireless communications network. Examples of communications devices or UEs are target devices, device to device UEs, machine type UEs or UEs capable of machine to machine communication, Personal Digital Assistants (PDA), iPADs, Tablets, mobile terminals, smart phones, Laptop Embedded Equipped (LEE), Laptop Mounted Equipment (LME), USB dongles etc.

In this disclosure the terms communications device and UE are used interchangeably. Further, it should be rioted that the term user equipment used in this disclosure also covers other communications devices such as Machine Type of Communication (MTC) device, an Internet of Things (IoT) device, e.g. a Cellular IoT (CIoT) device, Please note the term user equipment used in this document also covers other communications devices such as Machine to Machine (M2M) devices, even though they do not have any user.

Further, the first and second communications devices 102,104 are configured for wireless communication with each other when being located within a geographical area 106 served by one of the nodes, e.g. the second communications device 104, having radio coverage within the geographical area 106. Herein, this is also specified as the second communications device 104 manages or is configured to manage communication with the first communications device 102 in the geographical area 106. The geographical area 106 may be determined as the area where communication between the network nodes are possible, given one or more constraints on, e.g., output power, required data rate and similar. In this disclosure, the geographical area 106 is sometimes also referred to as a coverage area, a cell or a cluster. Further, communications devices, e.g. the first and second communications device 102,104, operating within the geographical area 106 may be referred to as belonging to a Basic Serving Set (BSS).

An example of how the first communications device 102 may operate for transmitting data to the second communications device 104 on a sub-channel of a total system bandwidth used in the communications network 100, will now be described with reference to the flowchart depicted in FIG. 2. As previously mentioned, the first and second communications devices 102,104 are operating in the wireless communications network 100. Further, the total system bandwidth comprises two or more sub-channels.

Figure 2:
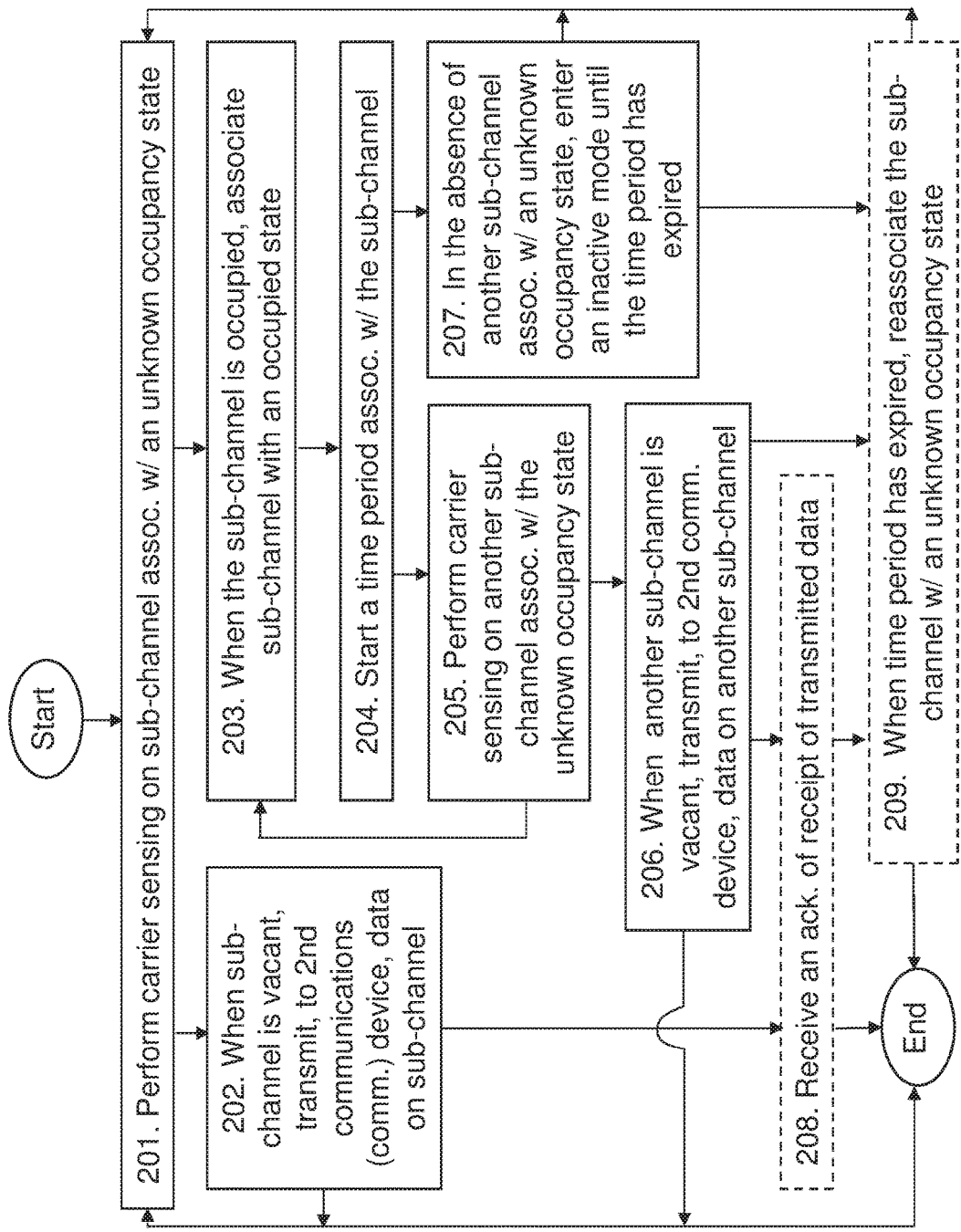
FIG. 2 is a flowchart schematically illustrating embodiments of a method performed by a first communications device.

The procedure depicted in FIG. 2 comprises one or more of the following actions, It should be understood that these actions may be taken in any suitable order and that some actions may be combined.

As will be described below, actions may be repeated in order to find a vacant sub-channel, e.g. a sub-channel being available for transmission. For example, some actions are performed on a first sub-channel but if the first sub-channel is determined as being occupied, some performed actions may be repeated on a second sub-channel, etc. The repetition may be performed until a vacant sub-channel is found or until no potentially vacant sub-channel is found. In this disclosure, a potentially vacant sub-channel is assigned an unknown occupancy state, Action 201

The first communications device 102 performs carrier sensing on a first sub-channel assigned an unknown occupancy state to determine whether the first sub-channel is vacant or occupied.

In some embodiments, all sub-channels are assigned the unknown occupancy state in the beginning. Thus, an initial assignment of all sub-channels to the unknown occupancy state may occur prior to the Action 201. The initial assignment may be performed by the first communications device 102.

If several sub-channels are assigned the unknown occupancy state, the first communications device 102 may select the first sub-channel in one of several ways. For example, the first communications device 102 may select the first sub-channel uniformly at random or according to some priority list. Selecting the first sub-channel according to a priority list may be done in several ways. It may be reasonable to assume that all sub-channels may have slightly different channel conditions due to for example: fading, narrow-band interferers, etc. Furthermore, because of changing environment, the channel conditions may also vary over time. Thus, one proposed alternative for the priority list is to let a link adaptation procedure, e.g. a Minstrel procedure, treat the sub-channels as available resources and select the most appropriate sub-channel. The priority may relate to historical or estimated throughput. The carrier sensing may be performed sequentially over the sub-channels being assigned the unknown occupancy state, picking first sub-channels with high priority. Non-prioritized sub-channels may be scanned in any arbitrary order.

In some embodiments, the first communications device 102 performs the physical carrier sensing by performing an energy detect physical carrier sensing, or a preamble detection and decoding. Thus, some embodiments herein relate to physical carrier sensing either by a threshold on the energy level, or by decoding a PHY preamble of transmission from a communications device, e.g. the second communications device 104, of the same technology as the first communications device 102. The reason for relating to physical carrier sensing is two-fold. Firstly, virtual carrier sensing requires to decode a full packet which is both time and energy consuming. Secondly, since the first communications device 102, e.g. the LRLP device, is expected to co-exist with legacy communications devices which are based on legacy wider band technologies, e.g. the IEEE 802.11 a/b/g/n/ac/ax, and since the LRLP device does not operate on such wide bands, it makes no sense to try to decode the packet in many cases. Thus, such LRLP devices may only be able to decode other LRLP devices preambles.

The first communications device 102 may perform the carrier sensing by performing a Carrier Sense Multiple Access (CSMA) such as a non-persistent CSMA. Non-persistent CSMA is a general mechanism for channel sensing. It may be performed using for example physical carrier sensing or preamble detection and decoding.

This may also be expressed as all sub-channels are categorised into two sets of sub-channels. A first set U comprises one or more sub-channels with an unknown availability and a second set O may comprise one or more sub-channels that are currently considered occupied. A respective timer may be associated to each sub-channel in the second set O. When the respective tinier expires, e.g. becomes inactive, the first communications device 102 moves the sub-channel from the second set O to the first set U, and performs a physical carrier sensing CSMA on the sub-channel. As will be described in Action 402 below, if the sub-channel is available, the first communications device 102 starts transmitting. It should be understood that a sub-channel may not reside in both the first and second sets U, O simultaneously.

Typically, when the first communications device 102 has new data to transmit, all sub-channels will reside in the first set U. Randomly, or according to a priority order, the first communications device 102 may sequentially, i.e., sub-channel-by-sub-channel, perform energy detect CSMA on the sub-channels. If the sub-channel is found to be occupied, a backoff time period is set and the first communications device 102 selects another channel from the first set U. The mechanism of choosing a backoff time period randomly, without ensuring the current transmission will be finished, is sometimes referred to as a non-persistent CSMA. If the channel is found to be available at this time, transmission starts, cf. Action 402 below.

Action 202

When the first sub-channel is determined as being vacant, the first communications device 102 transmits, to the second communications device 104, the data on the first sub-channel. Thus, the first communications device 102 will transmit on the first found vacant sub-channel, which in this case is the first sub-channel.

When the first sub-channel is determined as being occupied, the first communications device 102 performs the Actions 203-205 which will be described below. Further, it should be understood that the Actions 203-205 may be repeated for any further sub-channel, e.g. a second sub-channel, a third sub-channel, etc., as long as the previous sub-channel is determined as being occupied. In other words, actions may be repeated until a sub-channel determined as being vacant is found, i.e. until a sub-channel available for transmitting the data is found, or until no potentially vacant sub-channel is found.

Action 203

Thus, when the first sub-channel is determined as being occupied, the first communications device 102 assigns the first sub-channel an occupied state. Thereby, the first sub-channel will be identified as occupied.

In case of a repetition and when a second sub-channel is determined as being occupied, the first communications device 102 may assign the second sub-channel the occupied state.

Action 204

Further, when the first sub-channel is determined as being occupied, the first communications device 102 starts a first time period associated with the first sub-channel.

The first time period is a period of time during which the first sub-channel is considered as occupied, e.g. as being in the occupied state. As will be described in Action 209 below, after the first time period has expired, the first communications device 102 may not consider the first sub-channel as occupied but it may reassign the first sub-channel the unknown occupancy state, and thus the first sub-channel may be considered as being potentially vacant.

In some embodiments, the first time period is determined by a random time component, t_r, and a non-random time component, t_nr. The random time component, t_r, may be selected randomly in the interval between 0 and a maximum value, t_max. Further, the non-random time component, t_nr, may be obtained as any of: discovered when performing the carrier sensing, received from the second communications device 104 or a predefined value.

In case of a repetition and when a second sub-channel is determined as being occupied, the first communications device 102 starts a second time period associated with the second sub-channel. The second time period may be determined in the same way as the first time period.

The time period, e.g. the first or the second time period, may sometimes in this disclosure be referred to as a backoff time period.

Since it may be of interest to save as much energy as possible in the first communications device 102, the first communications device 102 may select the backoff time period immediately when the sub-channel is detected as being occupied. As mentioned above, the backoff time period may be a combination of two components; a random component T_r and a non-random component T_nr.

The non-random component T_nr may be selected based on physical carrier sensing. For example, if the first communications device 102 decodes the PHY preamble, the non-random component T_nr may be set accordingly. If the sub-channel is detected as occupied using only an energy threshold, the non-random component T_nr may be selected as a deterministic number. The deterministic number may for example be the average transmission time of a communications device, e.g. the first communications device 102. This number may also be determined by the second communications device 104, e.g. an AP, and signalled to the first communications device 102 during association or in management frames such as beacons. This facilitates for the second communications device 104 to consider the first communications device's 102 type while choosing a fixed number of the non-random component T_nr.

The random component T_r may be randomly chosen, uniformly or by some other distribution, from a range between 0 and T_max. The value T_max may be a fixed, a predefined value, or a value that may be different for each transmission. In the latter case, T_max may be larger, but not smaller, than a fixed, pre-defined value.

The non-random component T_nr and the random component T_r may either be of an arbitrarily resolution or of a granularity of time slots which is the standard approach of current WiFi systems.

Action 205

Furthermore, when the first sub-channel is determined as being occupied, the first communications device 102 performs carrier sensing on a second sub-channel assigned the unknown occupancy state to determine whether the second sub-channel is vacant or occupied.

The second sub-channel may be a sub-channel consecutive to the first sub-channel, a sub-channel selected according to a random selection among a total number of sub-channels, or it may be a sub-channel selected according to a priority list comprising a dynamic priority list.

The priority list may comprise information relating channel conditions for one or more sub-channels. For example, the channel conditions may relate to fading or narrow-band interference. Since the environment, e.g. the radio environment, may change over time also the channel conditions may change over time and therefore the priority list may be or comprise a dynamic priority list that is updated when a channel condition changes.

In some embodiments, the first communications device 102 performs the physical carrier sensing by performing an energy detect physical carrier sensing, or a preamble detection and decoding.

As mentioned above, the first communications device 102 may perform the carrier sensing by performing a CSMA such as a non-persistent CSMA.

When a second sub-channel is determined as being occupied, the first communications device 102 performs carrier sensing on a third sub-channel assigned the unknown occupancy state to determine whether the third sub-channel is vacant. It should by understood that third sub-channel may be the same sub-channel as the first sub-channel. For example, this may be the case when the first time period set in Action 204 has expired and the first communications deice 102 has reassigned the first sub-channel the unknown occupancy state as described in Action 209 below. However, the third sub-channel may be another sub-channel of the total system bandwidth.

Action 206

When the second sub-channel is determined as being vacant, the first communications device 102 transmits, to the second communications device 104, the data on the second sub-channel. This relates to Action 201 described above. However, in this case, the first found vacant sub-channel is the second cub-channel, and thus the first communications device 102 will transmit on the second sub-channel.

In case of a repetition and when the third sub-channel is determined as being vacant, the first communications device 102 transmits, to the second communications device 104, the data on the third sub-channel.

Action 207

In the absence of the second sub-channel assigned the unknown occupancy state, the first communications device 102 enters an inactive mode, e.g. defers from communicating, until the first time period has expired. Thus, if there is no second sub-channel assigned the unknown occupancy state there is no potentially vacant sub-channel and therefore the first communications device 102 enters the inactive mode, e.g. an idle mode or a sleep mode.

With the expression "inactive mode" when used in this disclosure is meant that a communications device, e.g. the first communications device 102, does not listen to the communications medium or transmit on the communications medium. An example of an inactive mode is a doze state, such as the doze state defined in the IEEE 802.11 standard (Section 10.2.1.2 STA Power Management modes).

Similarly, by the expression "active mode" when used in the disclosure is meant that a communications device, e.g.

the first communications device 102, either listens to the communications medium or transmits on the communications medium.

In case of a repetition and in the absence of the third sub-channel assigned the unknown occupancy state, the first communications device 102 enters the inactive mode until the first time period or the second time period has expired.

This may also be expressed as if all sub-channels are in the second set O and no tinier has expired, the first communications device 102 goes to inactive mode until one timer expires. Thus, if several timers have been set, e.g. several time periods have been started, the first communications device 102 will be in the inactive mode until a first one of the several timers has expired.

Action 208

In some embodiments, the first communications device 102 receives, from the second communications device 104, an acknowledgment of receipt of the transmitted data. Thereby, the first communications device 102 will know if the transmitted data has been received by the second communications device 104.

In some embodiments, if the first communications device 102 does not receive an acknowledgement of receipt of a transmission, e.g. no ACK is received after the transmission, the first communications device 102 may pick another sub-channel from the first set U and a repetition of the actions starting with the Action 201 may be performed, Action 209

When the first time period has expired, the first communications device 102 may reassign the first sub-channel the unknown occupancy state. Thus, when the first time period has expired, the first communications device 102 may not consider the first sub-channel as occupied but it may reassign the first sub-channel the unknown occupancy state, and thus the first sub-channel may be considered as being potentially vacant.

In some embodiments, when the second time period has expired, the first communications device 102 reassigns the second sub-channel the unknown occupancy state. Thus, when the second time period has expired, the first communications device 102 may consider the second sub-channel as not being in the occupied state but in the unknown occupancy state and therefore the first communications device 102 may assign the second sub-channel the unknown occupancy state.

Figure 3:
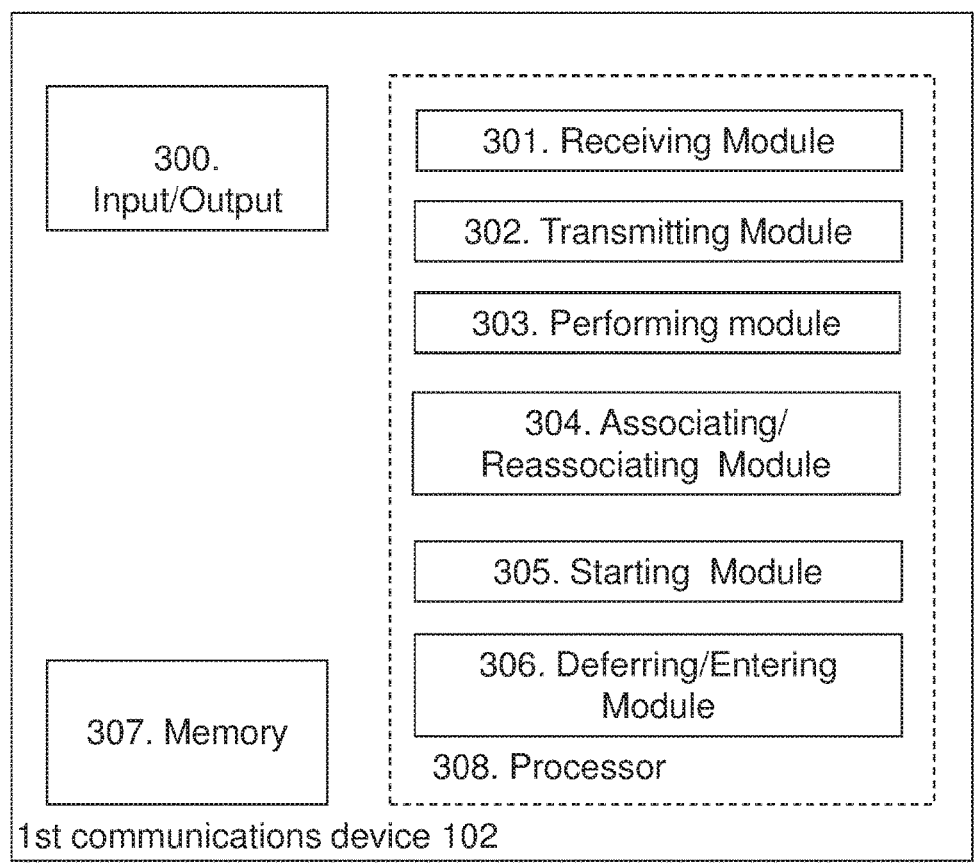
FIG. 3 is a block diagram schematically illustrating embodiments of a first communications device.

To perform the method for transmitting data to the second communications device 104 on a sub-channel of a total system bandwidth, the first communications device 102 may be configured according to an arrangement depicted in FIG. 3. As previously mentioned, the first and second communications devices 102,104 are configured to operate in the wireless communications network 100. Further, the total system bandwidth comprises two or more sub-channels.

In some embodiments, first communications device 102 comprises an input and output interface 300 configured to communicate with one or more communications devices, e.g. with the second communications device 104. The input and output interface 300 may comprise a wireless receiver (not shown) and a wireless transmitter (not shown).

The first communications device 102 is configured to receive, e.g. by means of a receiving module 301 configured to receive, a transmission from one or more communications devices, e.g. from the second communications device 104. The receiving module 301 may be implemented by or arranged in communication with a processor 308 of the first communications device 102. The processor 308 will be described in more detail below.

In some embodiments, the first communications device 102 is configured to receive, from the second communications device 104, an acknowledgment of receipt of the transmitted data.

The first communications device 102 is configured to transmit, e.g. by means of a transmitting module 302 configured to transmit, data on a sub-channel determined as being vacant. The transmitting module 302 may be implemented by or arranged in communication with the processor 308 of the first communications device 102.

When the first sub-channel is determined as being vacant, the first communications device 102 is configured to transmit, to the second communications device 104, the data on the first sub-channel. Thus, the first communications device 102 will transmit on the first found vacant sub-channel, which in this case is the first sub-channel.

When the second sub-channel is determined as being vacant, the first communications device 102 is configured to transmit, to the second communications device 104, the data on the second sub-channel. Thus, in this case, the first found vacant sub-channel is the second cub-channel, and therefore the first communications device 102 may be configured to transmit on the second sub-channel.

Further, when the third sub-channel is determined as being vacant, e.g. when being the first found vacant sub-channel, the first communications device 102 may be configured to transmit, to the second communications device 104, the data on the third sub-channel.

The first communications device 102 is configured to perform, e.g. by means of a performing module 303 configured to perform, carrier sensing on a sub-channel assigned an unknown occupancy state to determine whether the sub-channel is vacant or occupied. The performing module 303 may be implemented by or arranged in communication with the processor 308 of the first communications device 102.

Thus first communications device 102 is configured to perform the carrier sensing on a first sub-channel assigned the unknown occupancy state to determine whether the first sub-channel is vacant or occupied.

In some embodiments, the first communications device 102 is configured to perform the physical carrier sensing by performing an energy detect physical carrier sensing, or a preamble detection and decoding.

The first communications device 102 may be configured to perform the carrier sensing by performing the CSMA such as a non-persistent CSMA.

Furthermore, when the first sub-channel is determined as being occupied, the first communications device 102 is configured to perform carrier sensing on a second sub-channel assigned the unknown occupancy state to determine whether the second sub-channel is vacant or occupied.

As previously mentioned, the second sub-channel may be a sub-channel consecutive to the first sub-channel, a sub-channel selected according to a random selection among a total number of sub-channels, or it may be a sub-channel selected according to a priority list comprising a dynamic priority list.

The first communications device 102 may be configured to assign, e.g. by means of an assigning module 304 configured to assign, a state to a sub-channel. The assigning module 304 may be implemented by or arranged in communication with the processor 308 of the first communications device 102.

Thus, when the first sub-channel is determined as being occupied, the first communications device 102 is configured to assign the first sub-channel the occupied state. Thereby, the first sub-channel will be able to be identified as occupied.

When a second sub-channel is determined as being occupied, the first communications device 102 is configured to assign the second sub-channel an occupied state.

When a first time period has expired, the first communications device may be configured to assign, e.g. reassign, the first sub-channel the unknown occupancy state.

When the second time period has expired, the first communications device may be configured to assign, e.g. reassign, the second sub-channel with the unknown occupancy state.

The first communications device 102 may be configured to start, e.g. by means of a starting module 305 configured to start, a time period. The starting module 405 may be implemented by or arranged in communication with the processor 308 of the first communications device 102.

When the first sub-channel is determined as being occupied, the first communications device 102 is configured to start a first time period associated with the first sub-channel. In some embodiments, the first time period is determined by a random time component, t_r, and a non-random time component, t_nr. The random time component, t_r, may be selected randomly in the interval between 0 and a maximum value, t_max. Further, the non-random time component, t_nr, may be obtained as any of: discovered when performing the carrier sensing, received from the second communications device 104 or a predefined value.

When a second sub-channel is determined as being occupied, the first communications device 102 is configured to start a second time period associated with the second sub-channel. The second time period may be determined in the same way as the first time period.

The first communications device 102 may be configured to enter, e.g. by means of an entering module 306 configured to enter, an inactive mode. As previously mentioned, the first communications device 102 may be configured to defer from communicating over the communications network 100. Therefore, the entering module 306 is sometimes referred to as a deferring module. Further, the entering module 306 may be implemented by or arranged in communication with the processor 308 of the first communications device 102.

In the absence of the second sub-channel assigned the unknown occupancy state, the first communications device 102 is configured to enter the inactive mode, e.g. configured to defer from communicating, until the first time period has expired. Thus, if there is no second sub-channel assigned the unknown occupancy state there is no potentially vacant sub-channel and therefore the first communications device 102 enters the inactive mode, e.g. a sleep mode.

In the absence of the third sub-channel assigned the unknown occupancy state, the first communications device 102 may be configured to enter the inactive mode, e.g. may be configured to defer from communicating, until the first time period or the second time period has expired.

As described above, when the first time period has expired, the first sub-channel will be reassigned the unknown occupancy state and thus the first sub-channel may potentially be vacant. Correspondingly, when the second time period has expired, the second sub-channel will be reassigned the unknown occupancy state and thus the second sub-channel may potentially be vacant. Therefore, the communications device 102 may be in the inactive mode until one of the first and second sub-channels are potentially vacant.

The first communications device 102 may also comprise means for storing data. In some embodiments, the first communications device 102 comprises a memory 307 configured to store the data. The data may be processed or non-processed data and/or information relating thereto. The memory 307 may comprise one or more memory units. Further, the memory 307 may be a computer data storage or a semiconductor memory such as a computer memory, a read-only memory, a volatile memory or a non-volatile memory. The memory is arranged to be used to store obtained information, data, configurations, schedulings, and applications etc. to perform the methods herein when being executed in the first communications device 102.

Embodiments herein for transmitting data to the second communications device 104 on a sub-channel of a total system bandwidth may be implemented through one or more processors, such as the processor 308 in the arrangement depicted in FIG. 3, together with computer program code for performing the functions and/or method actions of embodiments herein. The program code mentioned above may also be provided as a computer program product, for instance in the form of a data carrier carrying computer program code for performing the embodiments herein when being loaded into the first communications device 102. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the first communications device 102.

Those skilled in the art will also appreciate that the input/output interface 300, the receiving module 301, the transmitting module 302, the performing module 303, the associating/reassociating module 304, the starting module 305 and the entering module 306 above may refer to a combination of analog and digital circuits, and/or one or more processors configured with software and/or firmware, e.g. stored in the memory 307, that when executed by the one or more processors such as the processors in the first communications device 102 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Exemplifying Scenarios

To clarify some embodiments described herein some exemplifying scenarios will now be described. In these examples, a transmitting device, e.g. the first communications device 102, may attempt to access the sub-channels in consecutive order, e.g. it first tries to access a first sub-channel n_1, then a second sub-channel n_2, etc. However, it should be understood that this is just one example of how to pick the order of the sub-channels. As mentioned above, several examples of selecting the order of the sub-channels exist. Further, the time interval used for sensing the respective sub-channel is represented by t_s. In a time-slotted communications network, e.g. the communications network 100, the time interval t_s may correspond to one time-slot or to a number of time-slots.

Figure 4:
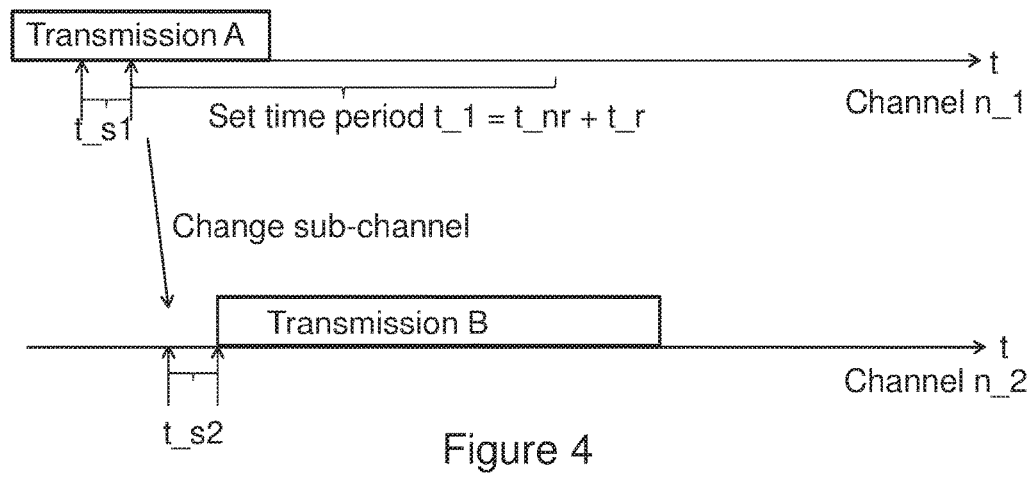
FIG. 4 schematically illustrates a first exemplifying scenario.

FIG. 4 schematically illustrates a first exemplifying scenario wherein the first communications device 102 has a transmission B that it would like to transmit. Firstly, the first communications device 102 attempts to transmit on the first sub-channel n_1. By performing non-persistent CSMA on the first sub-channel n_1 during a first time period t_s1, the first communications device 102 discovers that the sub-channel n_1 is occupied by a transmission A from the second communications device 104. Then, the first communications device 102 starts a timer, e.g. it starts time period t_1, and immediately switches to perform non-persistent CSMA on another sub-channel, in this example the second sub-channel n_2, during a second time period t_s2. The first and second time periods t_s1, t_s2 may be the same time periods. In this scenario, the physical carrier sensing reveals that the second sub-channel n_2 is idle, i.e. vacant, and thus the first communications device 104 begins the transmission B using the second sub-channel n_2.

Figure 5:
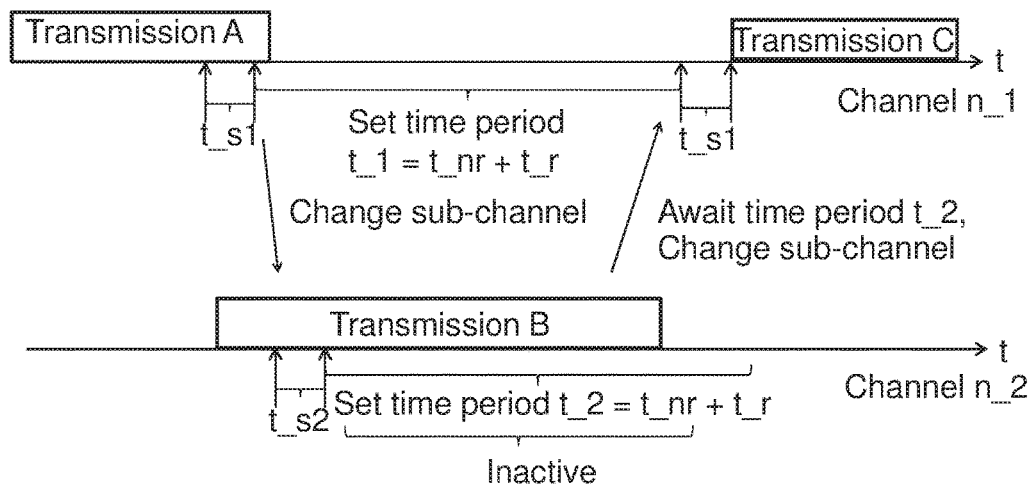
FIG. 5 schematically illustrates a second exemplifying scenario.

FIG. 5 schematically illustrates a second exemplifying scenario wherein there are in total two sub-channels, e.g. the first sub-channel and the second sub-channel n_2, in the communications network 100. The first communications device 102 has data, e.g. a transmission C, to transmit. Firstly, the first communications device 102 attempts to use sub-channel n_1, which is busy. So it starts the first time period t_1, and switches to sub-channel n_2, which turns out to also be busy. The first communications device 102 therefore starts a second time period t_2, and since there are no other sub-channels in the communications network 100, e.g. in the first group of sub-channels having an unknown occupancy, the first communications device 102 goes to sleep, e.g. enters an inactive mode, until the first time period t_1 expires. In this example, the timer t_1 is less than t_2 so the first communications device 102 is sleeping until t_1 expires. When the time period t_1 expires, the first communications device 102 again performs carrier sensing on the first sub-channel n_1, and since the first sub-channel n_1 is available it starts its transmission of transmission C.

Figure 6:
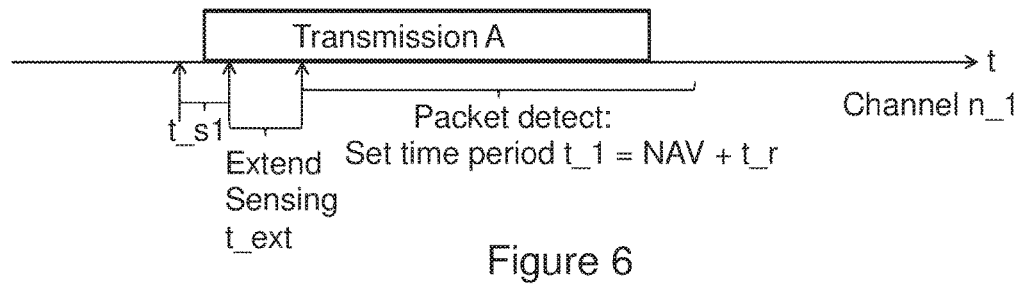
FIG. 6 schematically illustrates a third exemplifying scenario.

FIG. 6 schematically illustrates a third exemplifying scenario wherein physical carrier sensing is based on PHY preamble detection, During the time period t_s1, a packet, e.g. Transmission A, was detected. Thus, the sensing time t_s1 is extended with an extending time t_ext such that the first communications device 102 is able to decode the PHY preamble and to set its backoff time period, e.g. the first time period t_1, accordingly. In this case, the first time period t_1 is set to NAV+t_r, wherein NAV is the value of the Network Allocation Vector. Thus, the first communications device 102 will be in the inactive mode until the first time period t_1 has expired. When the time period t_1 expires, the first communications device 102 will perform a new carrier sensing on the first sub-channel n_1, and if it is available the first communications device 102 will transmit on the first sub-channel n-1.

Figure 7:
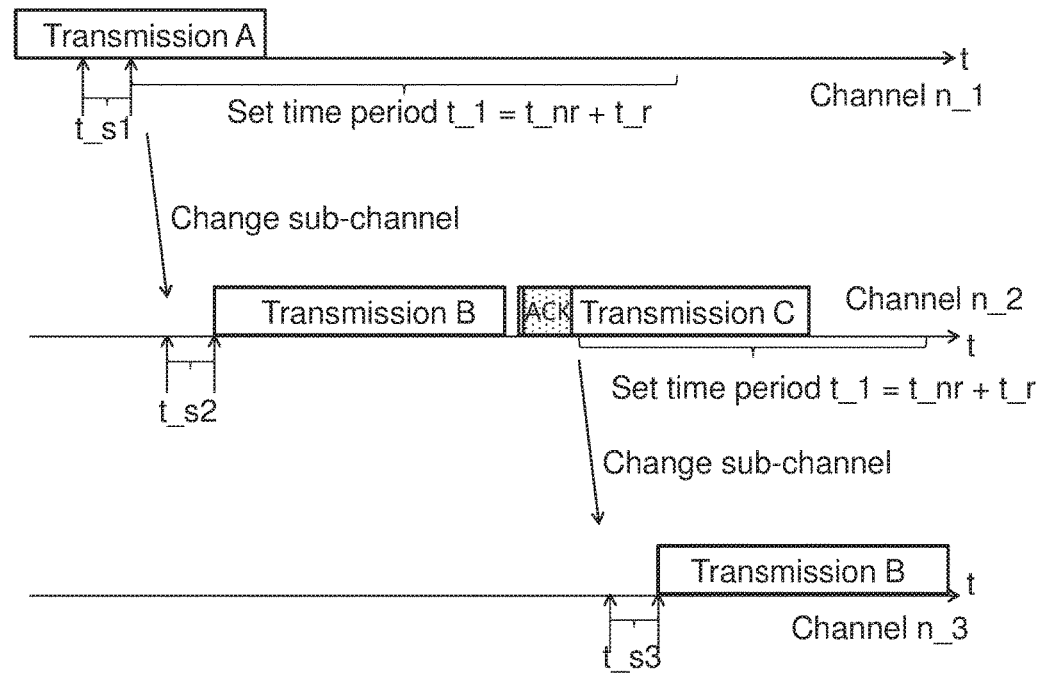
FIG. 7 schematically illustrates a fourth exemplifying scenario.

FIG. 7 schematically illustrates a fourth exemplifying scenario wherein the first communications device 102 does not receive an acknowledgement of its transmission. In FIG. 7, the first communications device 102 wants to transmit a message, e.g. a transmission B. It first attempts to transmit on the first sub-channel n_1, which is busy transmitting transmission A. The first communications device 102 therefore sets the first time period t_1, and switches to another sub-channel, e.g. the second sub-channel n_2, comprised in the first group of sub-channels comprising sub-channels having an unknown occupancy state. The first communications device 102 senses the second sub-channel n_2 and discovers that it is available. Therefore, the first communications device 102 transmits the data, e.g. the transmission B, on the second sub-channel n_2. Another communications device, e.g. a third communications device such as a hidden node (not shown), starts transmitting very soon after the transmission of transmission B has finished so the acknowledgement, e.g. the ACK, from the second communications device 104 to the first communications device 102 is lost. Therefore, the first communications device 102 believes the packet was not successfully transmitted. The first communications device 102 puts the second sub-channel n_2 in the second group of sub channels which comprises occupied sub-channels and chooses a new sub-channel from the first group, in this case a third sub-channel n_3, After sensing that this sub-channel is available, the first communications device 102 transmits its data, e.g. the transmission B, again to the second communications device 104 but this time using the third sub-channel n_3.

When using the word "comprise" or "comprising" it shall be interpreted as non-limiting, i.e. meaning "consist at least of".

The embodiments herein are not limited to the above described preferred embodiments, Various alternatives, modifications and equivalents may be used. Therefore, the above embodiments should not be taken as limiting the scope of the invention, which is defined by the appending claims.

The invention claimed is:

1. A method of operation by a first communication device, the method comprising:
 performing a sub-channel selection process in an attempt to find an unoccupied sub-channel from among a pool of sub-channels belonging to a total system bandwidth of a communications system; and
 terminating the sub-channel selection process responsive to finding an unoccupied sub-channel and selecting the found, unoccupied sub-channel as a selected sub-channel and using the selected sub-channel to transmit data to a second wireless communication device;
 wherein performing the sub-channel selection process includes evaluating each of one or more of the sub-channels in the pool on an individual basis using a carrier sensing procedure by which the first communication device deems a state of the sub-channel being evaluated as either occupied or unoccupied, and, for each sub-channel deemed to be occupied, excluding the sub-channel from the pool and starting a corresponding timer upon expiration of which the sub-channel is returned to the pool; and
 wherein the pool comprises sub-channels currently deemed to be in an unknown occupancy state, and wherein the method includes initially forming the pool by initially deeming all sub-channels belonging to the total system bandwidth to be in the unknown occupancy state.

2. The method of claim 1, further comprising returning the selected sub-channel to the pool, upon completion of the transmission of the data to the second communication device, or upon expiration of a corresponding timer started in association with selection of the selected sub-channel.

3. The method of claim 1, further comprising terminating the sub-channel selection process responsive to finding no unoccupied channel in the pool and, correspondingly:
 deferring transmission of the data to the second communication device;
 entering an inactive mode of operation; and
 subsequently exiting the inactive mode, in response to expiration of the timer corresponding to the first sub-channel evaluated in the sub-channel selection process.

4. The method of claim 1, further comprising maintaining the pool by, for each sub-channel that is excluded from the pool during the performance of the sub-channel selection process, deeming the sub-channel to be in an occupied state for the duration of the corresponding timer used to exclude the sub-channel from the pool, and, upon expiration of the corresponding timer, returning the sub-channel to the pool by reverting the deemed state of the sub-channel from the occupied state to the unknown occupancy state.

5. The method of claim 1, wherein the carrier sensing procedure comprises at least one of: an energy detection procedure that detects received energy on the sub-channel being evaluated; or a preamble detection and decoding procedure that attempts to detect and decode a preamble on the sub-channel being evaluated.

6. The method of claim 1, wherein the carrier sensing procedure comprises a Carrier Sense Multiple Access (CSMA) procedure.

7. The method of claim 1, wherein the corresponding timer for each sub-channel excluded from the pool by the sub-channel selection process represents a period that includes a random component serving as a back-off period for reevaluating the sub-channel.

8. A first communication device comprising:
transceiver circuitry configured to send and receive signals; and
processing circuitry operatively connected to the transceiver circuitry and configured to:
perform a sub-channel selection process in an attempt to find an unoccupied sub-channel from among a pool of sub-channels belonging to a total system bandwidth of a communications system; and
terminate the sub-channel selection process responsive to finding an unoccupied sub-channel and select the found, unoccupied sub-channel as a selected sub-channel and use the selected sub-channel to transmit data to a second wireless communication device;
wherein, to perform the sub-channel selection process, the processing circuitry is configured to evaluate each of one or more of the sub-channels in the pool on an individual basis using a carrier sensing procedure by which the first communication device deems a state of the sub-channel being evaluated as either occupied or unoccupied, and, for each sub-channel deemed to be occupied, exclude the sub-channel from the pool and start a corresponding timer upon expiration of which the sub-channel is returned to the pool; and
wherein the pool comprises sub-channels currently deemed to be in an unknown occupancy state, and wherein the method includes initially forming the pool by initially deeming all sub-channels belonging to the total system bandwidth to be in the unknown occupancy state.

9. The first communication device of claim 8, wherein the processing circuitry is configured to return the selected sub-channel to the pool, upon completion of the transmission of the data to the second communication device, or upon expiration of a corresponding timer started in association with selection of the selected sub-channel.

10. The first communication device of claim 8, wherein the processing circuitry is configured to terminate the sub-channel selection process responsive to finding no unoccupied channel in the pool and, correspondingly:
defer transmission of the data to the second communication device;
enter an inactive mode of operation; and
subsequently exit the inactive mode, in response to expiration of the timer corresponding to the first sub-channel evaluated in the sub-channel selection process.

11. The first communication device of claim 8, wherein the processing circuitry is configured to maintain the pool by, for each sub-channel that is excluded from the pool during the performance of the sub-channel selection process, deem the sub-channel to be in an occupied state for the duration of the corresponding timer used to exclude the sub-channel from the pool, and, upon expiration of the corresponding timer, return the sub-channel to the pool by reverting the deemed state of the sub-channel from the occupied state to the unknown occupancy state.

12. The first communication device of claim 8, wherein the processing circuitry is configured to carry out the carrier sensing procedure as at least one of: an energy detection procedure that detects received energy on the sub-channel being evaluated; or a preamble detection and decoding procedure that attempts to detect and decode a preamble on the sub-channel being evaluated.

13. The first communication device of claim 8, wherein the processing circuitry is configured to carry out the carrier sensing procedure as a Carrier Sense Multiple Access (CSMA) procedure.

14. The first communication device of claim 8, wherein the corresponding timer for each sub-channel excluded from the pool by the sub-channel selection process represents a period that includes a random component serving as a back-off period for reevaluating the sub-channel.

* * * * *